Dec. 3, 1968  J. N. JANSEN  3,414,843
FOUR-PART MICROWAVE FERRITE CIRCULATOR
Filed Oct. 24, 1965
FIG. 1
FIG. 2
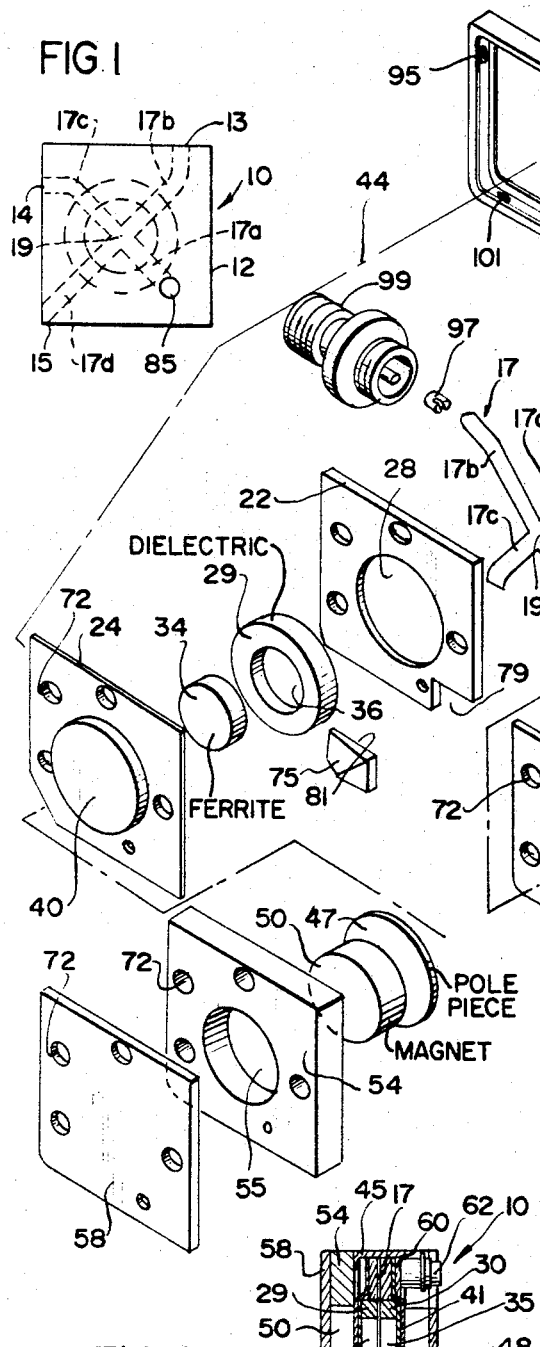
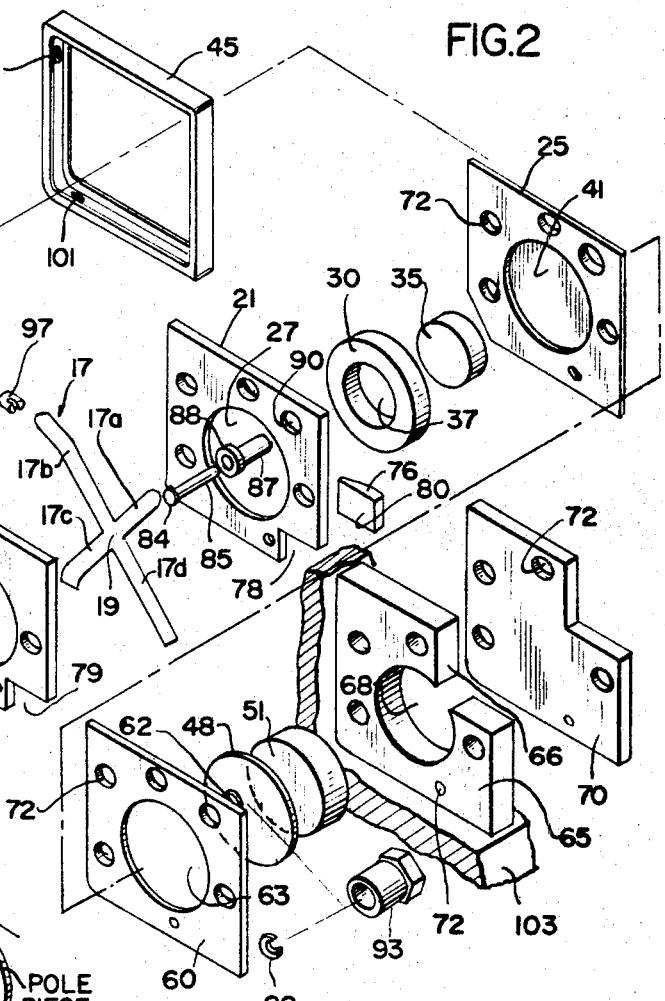
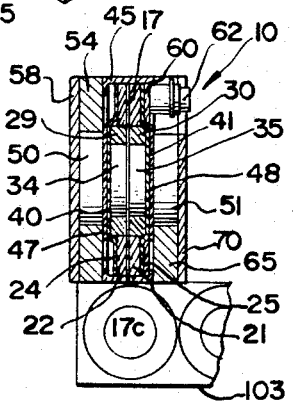
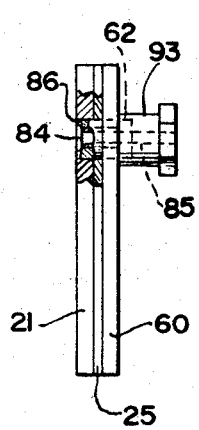
FIG. 3
FIG. 4
INVENTOR
JOSEPH NICHOLAS JANSEN
BY *Mueller, Aichele & Reamer*
ATTORNEYS

United States Patent Office 3,414,843
Patented Dec. 3, 1968

3,414,843
FOUR-PART MICROWAVE FERRITE CIRCULATOR
Joseph Nicholas Jansen, Scottsdale, Ariz., assignor to Motorola, Inc., Franklin Park, Ill., a corporation of Illinois
Filed Oct. 24, 1965, Ser. No. 504,841
3 Claims. (Cl. 333—1.1)

ABSTRACT OF THE DISCLOSURE

A four-port circulator of the ferrite type having an annular dielectric transformer ring around the ferrite to tune the dielectric or zero circulator mode to the $n=1$ mode.

---

This invention pertains generally to a strip transmission line microwave circulator device and more particularly to such a device for use in miniaturized electronic equipment such as radar transponders.

With the advent of space vehicles, there has been a continuing program within the electronic industry to produce equipment such as radar transponders and beacon local oscillators in miniature packages. This makes it possible to increase the amount of electronic equipment that can be carried on such a vehicle within the weight and space limitations. Further, such equipment must be extremely rugged as it is subjected to severe vibration, shock and acceleration conditions. One such radar transponder is described in copending application Ser. No. 500,572 assigned to the assignee of this application.

Circulator or duplexer units which have been used on radar transponders have been primarily of the three port type which have no provisions for protecting the transmitter from reflected signal waves. It has been proposed to join together two, three port circulators to provide a load or termination for the reflected waves, but this has resulted in a circulator center conductor radiating from two separate junctions to the various circulator ports, thereby making the units relatively large and heavy.

It is an object of this invention to produce an improved miniaturized strip transmission line microwave circulator device.

It is another object of this invention to provide a single junction four part circulator device which is of extremely rugged construction.

A further object of this invention is to produce a microwave circulator device for use with a radar transponder and the like that is efficient, compact, lightweight and can be effectively adapted into devices that have space limiting requirements.

A feature of this invention is a microwave circulator device having four ports and a strip transmission line including a center conductor having four arms radiating from a common junction in a symmetrical relationship and lying in a common plane. Three of the arms are coupled to signal devices and the fourth arm is terminated in a matched load for absorbing electromagnetic energy circulated to that arm.

Another feature of the invention is a microwave circulator device having gyromagnetic members in contact with the common junction on each side thereof and magnets coupled to the member for forming a magnetic field therein in a direction normal to the common plane of the center conductor, and having a dielectric transformer coupled between the gyromagnetic members and the ground plane insulators thereby broadbanding the members. The gyromagnetic members are responsive to radio frequency signals to form at least the zero and first circulator mode electromagnetic standing waveforms, and the dielectric transformer tunes the zero circulator mode to the first mode to reduce signal insertion loss and increase circulator isolation.

Still another feature of this invention is a microwave circulating device with a ground plane insulator having circular apertures therein, and the dielectric transformer including a pair of annular dielectric washers each having a bore. The gyromagnetic members are cylindrical in shape, and the annular washers are mounted concentrically around and in contact with the gyromagnetic members and concentrically within and in contact with the apertures in the ground plane insulators. The ground plane conductors have cap portions that receive the washers and gyromagnetic members concentrically mounted therewith. A thin walled rectangular shield cooperates with the ground planes and cap portions to form an enclosure for housing the strip transmission line, dielectric transformer washers and the gyromagnetic members.

A further feature of this invention is the provision of a circulator which is used as a duplexer for a radar transponder and has a connector pin contacting one of the conductor arms normal to the plane common to the arms and extending through one of the ground plane insulators and associated ground plane conductors to provide a connection between the duplexer and the radar transmitter.

In the drawing:

FIG. 1 is a plan view of the circulator device in accordance with this invention;

FIG. 2 is an exploded view showing the elements of the circulator device of FIG. 1;

FIG. 3 is a side elevation view partly in cross-section of a portion of the device of FIG. 1; and FIG. 4 is a side elevation and cross-section of the device of FIG. 1.

In one specific embodiment of this invention, a circulator device is used in a radar transponder to permit alternate use of the same antenna for both transmitting and receiving radio signals. The unit has a strip transmission line including a center conductor sandwiched between a pair of insulators and a pair of ground plane econductors. The center conductor consists of four arms radiating from a common junction in a symmetrical relationship with one another and lying in the same plane. Each of the arms is connected to a different one of the circulator ports. The first arm is connected to the radar transmitter, the second arm to the antenna, the third arm to the receiver and the fourth arm to a matched load. A pair of gyromagnetic members contact the junction on each side. Magnets are coupled to the members and form a magnetic field in a direction normal to the plane of the center conductor. A dielectric transformer is coupled between the members and the ground plane insulators and acts to broad band the members. The gyromagnetic members are responsive to a radio frequency signal coupled thereto by one of the arms to form at least the zero and first circulator mode electromagnet standing waveforms and to circulate the electromagnetic energy to an arm adjacent to the aforementioned arm and in a direction determined by the magnetic biasing field. The transformer besides broadbanding the members also tunes the circulator to the first mode to reduce signal insertion loss and increase circulator isolation. Because the transmitted waves are reflected from the antenna and receiver and are circulated by the gyromagnetic members to the fourth port, the matched load coupled to the arm at the fourth port absorbs the electromagnetic energy and prevents the waves from being reflected from that port and circulated back to the transmitter where they could possibly damage the same.

The figures of the drawing illustrate the construction of the four port circulator device 10 which includes a single junction strip transmission line having a center conductor 17. Center conductor 17 has portions or arms 17a, b, c, and d that lie in a common plane and extend from a common junction 19 in a symmetrical manner with the axes of the conductor arms subtending equal angles with each other. The arms 17a, b, c, and d of the center conductor 17 are connected to the four ports 12, 13, 14 and 15 respectively of the circulator 10 and are sandwiched between dielectric sheets or ground plane insulators 21 and 22 and ground plane conductors 24 and 25 to complete the strip line assembly.

The dielectric sheets 21 and 22 have apertures 27 and 28 respectively through the centers thereof. Annular dielectric washers 29 and 30, which have outer diameters approaching the diameters of the apertures 27 and 28, are concentrically fitted with a contact fit into the apertures. The washers 29 and 30 also contact the portions 17a, b, c, and d of the center conductor 17. A pair of gyromagnetic members 34 and 35 cylindrical in shape, are made from a material such as magnesium aluminum ferrite or yttrium iron garnet and have a diameter approaching the diameter of the bores 36 and 37 of the annular washers 29 and 30. The members are concentrically positioned within the washers and in contact with the common junction 19 of the center conductor 17. The tolerances are such between the cylindrical members 34 and 35 and the bores 36 and 37 of the washers that they contact each other. Strip transmission line ground plane conductors 24 and 25 each have a round cap or boss portion 40 and 41 which are of a diameter and depth such that they house the washers 29 and 30 and are in contact with the gyromagnetic members 34 and 35. The strip line assembly shown by the broken line 44 (FIG. 2) is mounted within the shielding member 45 which cooperates with the ground planes 24 and 25 to completely shield the strip transmission line washers and gyromagnetic members.

A pair of thin disc-like pole pieces 47 and 48 having a diameter approaching the diameter of the caps 40 and 41 and in any instance at least equal in diameter to the diameter of gyromagnetic members 34 and 35, are coaxially aligned in contact therewith, and a pair of cylindrical permanent magnets 50 and 51 with a lesser diameter than the discs 47 and 48 are mounted coaxially with and in contact with the discs. The circulator cover 54, which has an aperture 55 in the center thereof, is then placed in position at one end of the circulator 10 against the ground plane 24. The aperture 55 has an axial thickness sufficient to house the cap 40, disc 47 and magnet 50. A flat pole piece 58 is then mated flush to the cover 54 in contact with magnet 50.

At the other end of the circulator 10, a plate 60 which has a connector bushing 62 integral therewith is mounted to the ground plane 25. Plate 60 has an aperture 63 therein that is of a diameter sufficient to receive the cap 41 and disc 48 within a close tolerance. The circulator cover 65 which has a corner 66 removed to provide clearance for the connector 62 is then positioned against the plate 60. The cover 65 also has an aperture 68 in the center thereof with an axial thickness sufficient to house the magnet 51. A flat pole piece 70 is fitted flush against the cover 65 in contact with the magnet 51, and also has a corner 67 removed for clearing bushing 62. Magnetic screws (not shown) pass through the holes 72 in the various plates of the circulator 10 to secure the same in a compact package as shown in FIG. 3.

In the described circulator, the arm 17d is terminated at port 15 by a matched load, consisting of a pair of pin blocks 75 and 76 formed from a standard terminating material such as a polyiron in plastic. Dielectric sheets 21 and 22 each have a corner 78 and 79 removed, and the blocks 75 and 76 are so dimensioned and of such a thickness that they fit into the areas 78 and 79 flush with the sides of the sheets 21 and 22. With the blocks 75 and 76 so positioned, their flat faces 80 and 81 are mated together, and compressed together in this position by the ground planes 24 and 25. Sandwiched between the blocks 75 and 76 and in contact therewith is the strip line arm 17d.

Connection is made to arm 17a of the strip connector 17 by the flat head portion 84 of a right angle connector pin 85. The connector pin 85 fits into the sleeve insulator 87; the annular head 88 of the sleeve insulator 87 is dimensioned to fit in hole 90 flush with the sides of the dielectric sheet 21. The pin 85 and sleeve insulator 87 extend into the connector bushing 62. A lock washer 92 fits into a groove on the bushing 62 and is used to secure the hex head connector 93 to the bushing. However, connections to all of the ports may be accomplished with standard miniature RF panel connectors or with integrated circuitry.

In operation, since the gyromagnetic members 34 and 35 are on either side of the single junction 19, the member 35 behaves as a mirror image of member 34 so an analysis need only be made for member 34. When an RF signal is coupled through connector pin 85 to the port 12 and through arm 17a of connector 17 to the gyromagnetic member 34, it excites the zero or dipolar standing wave mode of the member 34. In this zero mode the electric field vectors are normal to the plane of the member 34 and the RF magentic field vectors lie parallel to the plane of the member 34. The magnet 50, however, provides a magnetic field normal to the member 34 biasing that member to form a split first standing wave mode of two counter-rotating electromagnetic fields in addition to the zero mode. With the RF magnetic field rotating in the same sense as the electron spin of the gyromagnetic member 34, the electromagnetic field tends to precess under the influence of the biasing field.

At a frequency between the resonant frequencies of the counter rotating fields lies the operating frequency of the first mode standing wave. In order to produce a low VSWR, low insertion loss and have high isolation over a broad band of frequencies, it is necessary to have the zero circulator mode tuned to the operating frequency of the first mode. This tuning is uniquely accomplished in the invention by the dielectric washer 29 which is coupled between the gyromagnetic member 34 and the dielectric sheets 21 and 22 of the strip transmission line. Besides tuning the zero mode to the first mode, the dielectric washer 29 acts as a transformer to broad band match the gyromagnetic member 34 over a wide band of applied RF frequencies.

FIG. 4, shows the circulator 10 connected to an RF filter 103 which is constructed integral with the circulator cover 65 as an expedient means for constructing a compact unit for use for instance with a compact radar transponder (not shown). When used in conjunction with the radar transponder, the circulator 10 of this invention serves as a duplexer. The right angle connector pin 85 connects the transponder transmitter to port 12. The arm 17b of the conductor 17 extends through the aperture 95 in the shield 45 and is welded to a bifurcated connector 97 which connects the antenna terminal 99 to port 13. Terminal 99 is a pressurized connector suitable for front panel attachment to a pressurized container. The arm 17c of the conductor 17 extends through aperture 101 in the shield 45 and is soldered to a piece of transmission line (not shown) which is connected to the inside of the RF filter 103 (FIG. 4) thereby connecting the transponder receiver to port 14. Port 15 as previously described is connected to the matched load 75 and 76.

In the operation of the circulator or duplexer 10, the value of the applied magnetic field is sufficient to saturate the gyromagnetic members 34 and 35 but insufficient to cause ferrimagnetic resonance of the members. This is the most efficient manner in which to bias the members 34 and 35 as it requires a minimum magnetic field and a gyromagnetic member that is made of a relatively low saturation material. It is possible, of course, to saturate the members 34 and 35 to a point above resonance, this requires a larger magnetic field and therefore is not as desirable. Circulation will be in a clockwise or counter clockwise manner depending on the direction of the transverse magnetic biasing field. In this instance the field is in a direction to cause the first standing wave mode of the RF signal from the transmitter at port 12 to be rotated or precessed towards the output or antenna port 13. With the zero circulator mode excited by the input port and being tuned to the operating frequency of the first mode by the transformers 29 and 30, the counter-rotating electromagnetic fields are equal and in phase at the output port 13 so the electromagnetic energy is transmitted from that port. However, at ports 14 and 15 the counter-rotating fields are in opposite phase and will cancel each other.

If the antenna is not properly matched to the transmitter some of the circulated energy will be reflected back from the antenna. When this occurs the gyromagnetic members 34 and 35 will circulate the electromagnetic energy to the next port 14, which is the port to which the receiver is connected. Because the receiver preselector or filter 103 is tuned to a different frequency than the transmitted frequency, the electromagnetic energy will again be reflected and circulated to the next port 15 which is the terminal load 75 and 76. If this reflected signal were circulated back to the transmitter, it would have harmful effects including possible burning out of the transmitter. The matched load 75 and 76, however, acts as a termination by absorbing the energy thereby preventing any further reflection to the transmitter.

A convenient method for eliminating heat from the gyromagnetic members consists of transferring the heat through the magnets 50 and 51 to the flat pole pieces 58 and 70 from which the heat is transferred to a transponder heat sink not shown, and dissipated to the atmosphere.

What has been described is an improved miniaturized single junction four port microwave circulating device that is rugged, efficient, compact, lightweight and that can be adapted into devices that have space limiting requirements.

I claim:
1. A four-port microwave circulating device, including in combination:
   a strip transmission line including a center conductor sandwiched between a pair of ground plane insulators and a pair of ground plane conductors, each of said ground plane conductors having a cap portion extending away from said ground plane insulator, said ground plane conductors forming a housing means for the circulator,
   said center conductor having a common junction with four arms symmetrically radiating outwardly from said junction in a common plane and located substantially coaxially of said cap portions,
   a pair of gyromagnetic members in contact with said common junction on each side thereof and positioned between said ground plane conductor cap portions,
   magnetic bias means coupled to said gyromagnetic members for causing a magnetic field therein in a direction transverse to said common plane,
   said magnetic bias means including a pair of substantially flat pole pieces, each of said pole pieces contacting a different one of said cap portions of said ground plane conductors,
   a pair of magnets, each of said magnets contacting a different one of said pole pieces,
   a pair of circulator covers having apertures therein coaxial of said cap portions and receiving said magnets in said apertures,
   a pole piece plate being mounted flush to a different one of said circulator covers remote from said ground plane conductors,
   transformer means comprising a pair of dielectric rings respectively disposed around said gyromagnetic members,
   each said insulator having an aperture coaxial with said cap portion respectively receiving said dielectric rings,
   said gyromagnetic members being responsive to a radio frequency signal coupled thereto by one of said arms to form at least a zero and a first circulator mode electromagnetic standing wave for circulating electrical magnetic energy to an arm adjacent to said one arm, said standing waves being formed by counter-rotating electric fields, one of said fields having twice the frequency of another rotating electric field,
   said transformer means cooperating with said zero circulating mode for adjusting its frequency of operation to the frequency of said first mode and serving to broad band the circulator,
   said gyromagnetic members and said transformer means and said magnetic bias means contacting said housing means adjacent said gyromagnetic members, and means for joining said pole piece plates to said circulator covers and said housing means to form a compact circulator device.

2. The circulating device of claim 1 wherein said ground plane insulators have circular apertures therein, said gyromagnetic members are cylindrical in shape, said transformer means include a pair of annular dielectric washers each having a bore, and said annular washers are mounted concentrically around and in contact with said cylindrical gyromagnetic members and concentrically within and in contact with said apertures in said ground plane insulators.

3. A compact circulator device, including in combination,
   a signal conductor having a center common junction with four symmetrically outwardly radiating arms,
   a pair of plate-like insulators disposed in contact on opposite sides of said signal conductor and each having a circular aperture of greater diameter than and coaxially disposed with respect to said common junction, a pair of circular cylindrical gyromagnetic members disposed on opposite sides of and contacting said common junction and being coaxial to said circular apertures and spaced from said plate-like insulators in the respective apertures,
   a pair of circular annular dielectric rings disposed respectively between said gyromagnetic members and said plate-like insulators in the respective apertures thereof and being in contiguous radial contact with both said plate-like insulators and said gyromagnetic members,
   a pair of ground plane conductors disposed on opposite sides of said plate-like insulators and being in contiguous respective contact therewith and each ground plane conductor having a cap portion extending away from the respective plate-like insulators and respectively receiving a portion of the respective gyromagnetic members and said circular annular dielectric rings and being in contact with said respective gyromagnetic members to complete a magnetic path through said common junction and extending between said cap portions, and
   magnetic bias means for supplying a magnetic field between said cap portions for magnetically biasing said gyromagnetic members to be responsive to an input signal on one of said arms to cause counter-rotating electric fields with one field having a frequency twice the frequency of the other field and said dielectric rings cooperating with the field having the lower frequency to double its frequency and further broadbanding the frequency response of the circulator.

(References on following page)

References Cited

UNITED STATES PATENTS

| | | | |
|---|---|---|---|
| 2,890,328 | 6/1959 | Fox | 333—1.1 X |
| 3,136,950 | 6/1964 | Mackey | 333—1.1 X |
| 3,165,711 | 1/1965 | Drumheller et al. | 333—1.1 |
| 3,201,722 | 8/1965 | May et al. | 333—84 (M)AXR |
| 3,209,284 | 9/1965 | Hast | 333—22 X |
| 3,295,074 | 12/1966 | Carr | 333—1.1 |
| 3,085,212 | 4/1963 | Clark et al. | 333—1.1 |

OTHER REFERENCES

Lax et al., Microwave Ferrites and Ferrimagnetics, McGraw-Hill, N.Y., 1962, p. 620 cited.

HERMAN KARL SAALBACH, *Primary Examiner.*

PAUL L. GENSLER, *Assistant Examiner.*